(12) United States Patent
Spears

(10) Patent No.: US 7,017,951 B2
(45) Date of Patent: Mar. 28, 2006

(54) STRENGTHENED PIPE FITTING HAVING ENCAPSULATED REENFORCING COLLAR

(75) Inventor: Wayne Spears, Ketchikan, AK (US)

(73) Assignee: Spears Manufacturing Co., Sylmar, CA (US)

( * ) Notice: Subject to any disclaimer, the term of this patent is extended or adjusted under 35 U.S.C. 154(b) by 39 days.

(21) Appl. No.: 10/243,127

(22) Filed: Sep. 13, 2002

(65) Prior Publication Data

US 2004/0051316 A1 Mar. 18, 2004

(51) Int. Cl.
*F16L 15/00* (2006.01)

(52) U.S. Cl. .................. 285/390; 285/333; 285/423
(58) Field of Classification Search ............... 285/333, 285/334, 355, 390, 382, 423; 411/432; 29/446
See application file for complete search history.

(56) References Cited

U.S. PATENT DOCUMENTS

| | | | | |
|---|---|---|---|---|
| 418,752 | A | * 1/1890 | Rogers | ............... 285/381.1 |
| 3,232,638 | A | 2/1966 | Hollander | |
| 3,545,794 | A | * 12/1970 | Wise | ................. 285/248 |
| 3,614,137 | A | 10/1971 | Jacobson | |
| 3,813,098 | A | 5/1974 | Fischer et al. | |
| 3,819,207 | A | * 6/1974 | Leopold, Jr. | ............... 285/45 |
| 4,015,321 | A | * 4/1977 | Witter | ................ 29/890.15 |
| 4,018,462 | A | 4/1977 | Saka | |
| 4,426,761 | A | 1/1984 | Sassak | |
| 4,470,188 | A | 9/1984 | Holbrook et al. | |
| 4,488,738 | A | 12/1984 | Valdes | |
| 4,627,149 | A | 12/1986 | Colas | |
| 4,682,797 | A | * 7/1987 | Hildner | ................. 285/40 |
| 4,750,525 | A | 6/1988 | Vaughan | |
| 4,768,910 | A | 9/1988 | Rath | |
| 5,044,671 | A | 9/1991 | Chisnell et al. | |
| 5,139,290 | A | 8/1992 | Shafer | |
| 5,193,859 | A | * 3/1993 | McKinnon | ............... 285/417 |
| 5,215,341 | A | * 6/1993 | Namakura et al. | ....... 285/423 |
| 5,228,721 | A | 7/1993 | Whittle et al. | |
| 5,234,233 | A | 8/1993 | Fix | |
| 5,277,456 | A | * 1/1994 | Mer et al. | ............... 285/21.2 |
| 5,309,621 | A | 5/1994 | O'Donnell et al. | |
| 5,317,799 | A | 6/1994 | Chapman et al. | |
| 5,338,070 | A | 8/1994 | Horikawa et al. | |
| 5,347,701 | A | 9/1994 | Hosseinian et al. | |
| 5,437,481 | A | * 8/1995 | Spears et al. | ........... 285/148.13 |
| 5,582,439 | A | 12/1996 | Spears | |
| 6,186,558 | B1 | * 2/2001 | Komolrochanaporn | . 285/148.19 |
| 6,305,723 | B1 | * 10/2001 | Schutz et al. | ............... 285/333 |
| 6,367,850 | B1 | * 4/2002 | Thrift et al. | ............... 285/382 |

* cited by examiner

*Primary Examiner*—James M. Hewitt
(74) *Attorney, Agent, or Firm*—Denton L. Anderson; Sheldon & Mak

(57) ABSTRACT

A strengthened pipe fitting has an internally threaded surface and a compression band. The compression band is sized to compress the internally threaded surface sufficiently so that the pipe fitting is subjected to a compressive preload. The compression band is covered with a non-corrosive material.

20 Claims, 1 Drawing Sheet

STRENGTHENED PIPE FITTING HAVING ENCAPSULATED REENFORCING COLLAR

FIELD OF THE INVENTION

The present invention is directed to strengthened pipe fittings and a method for making strengthened pipe fittings.

BACKGROUND OF THE INVENTION

Pipe fittings and, more specifically, hollow, tubular shaped pipe fittings having connector ends with either internal taper threads (commonly referred to as female pipe threads) or external taper threads (commonly referred to as male pipe threads) are commonly used in the plumbing and hardware industry. Typically, male pipe threads of a pipe fitting are threaded into female pipe threads in a second pipe fitting to form a pipe joint. The pipe joint relies upon the wedging action of the oppositely tapered male and female pipe threads to seal the pipe joint. In operation, the wedging action between the male and female pipe threads causes the pipe fitting with the male pipe threads to compress and the pipe fitting with the female pipe threads to expand. However, the wedging action can cause structural failure of the female pipe fitting during joint make-up if the pipe joint is overtightened or stress fatigue failure of the female pipe fitting over time, since the tubular shape of the pipe fitting is more susceptible to expansion than compression.

Pipe fittings made of plastic with female pipe threads are particularly susceptible to structural failure. These plastic pipe fittings can fail prior to obtaining a pressure-tight seal at the pipe joint. Thus, an entire pipe system may have to be derated as a result of the weakened plastic pipe joint.

The prior art has attempted to solve this problem by placing a reinforcement band around the outside of the female pipe fitting to restrict and/or inhibit expansion and splitting of the pipe fitting. However, this method has proved not to be satisfactory. Accordingly, there is a need for strengthened pipe fittings with female pipe threads and a method for making pipe fittings with female pipe threads which (i) withstand deformation produced during joint make-up, overtightening of the pipe joint and stress fatigue failure over time, and (ii) allow for the use of plastic pipe fittings without the need for pressure derating in the pipe system.

In U.S. Pat. No. 5,582,439, the entire contents of which are incorporated by this reference, a strengthened pipe fitting is disclosed which solves most of the aforementioned problems. The strengthened pipe fitting comprises a pipe fitting having an internally threaded surface initiated from an attachment end and a compression band fitted onto the attachment end. The pipe fitting is initially manufactured in the absence of the compression band, so as to have an internally threaded surface with a pitched diameter larger than that specified for mating with a desired externally threaded member. The compression band is then fitted onto the attachment end of the pipe fitting. The compression band is uniquely sized to compress the internally threaded surface sufficiently so that the internally threaded surface mates with the externally threaded member. Since the compression band compresses the attachment end of the pipe fitting, the pipe fitting is subjected to a compressive preload. Thus, the expansion load upon the internally threaded surface resulting from wrench-tight engagement with the externally threaded member is reduced by the preexisting compressive load subjected upon the strengthened pipe fitting.

Unfortunately, it has been found that this unique strengthened pipe fitting is not wholly without problems. Specifically, a problem has been found when using this strengthened pipe fitting in corrosive atmospheres. Because the compression band is most typically made of a metal, use of the strengthened pipe fitting within a corrosive atmosphere results in the corrosion, and sometimes failure, of the compression band.

Accordingly, there is a need for a metal or plastic fitting that overcomes this problem in the prior art.

SUMMARY OF THE INVENTION

The present invention is directed to strengthened pipe fittings and a method for making strengthened pipe fittings that satisfy this need, the strengthened pipe fittings being able to better withstand deformation produced during joint make-up, overtightening during joint make-up, and stress fatigue failure. Thus, there is less risk of failure of female pipe fittings. A strengthened pipe fitting for connecting to an externally threaded member, having features of the present invention, includes (i) a pipe fitting having an internally threaded surface initiating from an attachment end and (ii) a compression band fitted onto the attachment end of the pipe fitting. As described below, the internally threaded surface is manufactured, before the compression band is fitted on to the pipe fitting, with a pitch diameter larger than what is normally recommended to mate with the externally threaded surface. Applicant's invention is unique in that, in absence of the compression band, the internally threaded surface is oversized and may not be able to obtain a pressure tight seal with the externally threaded surface. The compression band, which is fitted onto the piped fitting, is sized to compress the internally threaded surface sufficiently so that the internally threaded surface of strengthened pipe fitting has a pitch diameter that is normally recommended to mate with the externally threaded member.

Thus, the attachment end of the strengthened pipe fitting is subjected to a radial compressive preload prior to being threaded onto the externally threaded member. Therefore, as the strengthened pipe fitting is threaded onto the externally threaded member, the expansion caused during joint make-up relieves the compressive preload subjected upon the attachment end by the compression band. Accordingly, the resulting expansion load upon the internally threaded surface, after joint make-up with the externally threaded member is complete, is reduced.

To avoid corrosion of the compression band, the compression band is covered with a plastic or other non-corrosive material.

The following is a list of definitions and symbols for terms used in this Application:

Number of threads per inch—(N).

Pitch of Thread—(P) is the reciprocal of the specified number of threads per inch, (P=1/N).

Taper of thread—(T) is the specified reduction in adjacent thread size measured on the diameter and along the central axis of the pipe or fitting, expressed in inches per foot. For example, tapered pipe threads have a specified taper of ¾ inch per foot, or ⅟₁₆ taper.

Pitch line—is the line representing the specified taper of a pipe thread in relation to the central axis of the pipe or fitting.

Vanish threads—are the increasingly incomplete ("vanishing"), unusable external threads located adjacent to the intersect of the pitch line with the external surface of the pipe, produced by the incomplete threads along the chamfered entry of the mechanical die used to cut the threads into the pipe.

Hand tight (finger tight) engagement—is the normal length of thread engagement between external and internal tapered pipe threads when screwed together hand tight (finger tight), specified in either (i) inches ($L_1$) or (ii) number of threads or 360 degree turns (Y) at a specified basic pitch diameter. This length is measured and controlled with standardized thread gauges where the gauging-plane diameter and gauge length is equal to the specified pitch diameter and thread length. Gauged deviation from this basic size is expressed as plus or minus turns from the basic dimension, where one (1) thread equals one (1) 360 degree turn.

Wrench tight engagement—is the allowed length of thread engagement beyond hand tight (finger tight) for additional wrenched turns of thread engagement between external and internal tapered pipe threads, specified in either (i) inches ($L_3$) or (ii) number of threads or 360 degree turns (W) at a specified basic pitch diameter, where one (1) thread equals one (1) 360 degree turn of engagement. With thermoplastic tapered pipe threads, a maximum of two (2) 360 degree turns is generally recommended.

Effective thread length—($L_2$) the length of useable external tapered pipe threads; that portion of the overall external thread length excluding the unusable vanish threads.

Pressure tight seal—reference to the designed ability of a threaded joint to contain internal pressures of a piping system, as opposed to threaded joints designed solely for mechanical connection or support of pipe.

Pitch diameter—is the basic diameter of a pipe thread measured along the pitch line. Specifications for pitch diameters are mathematically determined from the outside diameter of the pipe and the pitch of the thread.

Pitch diameter at attachment end—($E_1$) standard provided for given size in ANSI/ASME Standards.

Pitch diameter expansion—($E_E$) is the expansion which occurs in the pitch diameter during wrench tight engagement.

Pitch diameter at the attachment end originally produced in internally threaded surface—($E_P$) determined by manufacturer.

Inside diameter of compression band—(ID).

Outside diameter of pipe fitting at the attachment end—(OD).

Minimum Length of compression band—approximately equal to the effective thread length ($L_2$).

Plane of normal wrench tight engagement is the innermost applicable internal threads.

Typically, the pipe fitting is made from a plastic material since (i) plastic is readily compressible, (ii) plastic pipe fittings can be used in a variety of applications and (iii) plastic pipe fittings with internally threaded surfaces are particularly susceptible to structural failure during joint make-up.

The internally threaded surface extends from the attachment end of the pipe fitting to at least the plane of normal wrench tight engagement. The internally threaded surface has a pitch diameter along the internally threaded surface and an effective thread length which extends from the attachment end to the plane of normal wrench tight engagement.

Typically, the internally threaded surface is either tapered internal pipe threads or straight internal pipe threads. In the case of tapered internal pipe threads, the pitch diameter decreases along the internally threaded surface from the attachment end to the plane of normal wrench tight engagement. Alternatively, with straight internal pipe threads, the pitch diameter remains constant along the internally threaded surface from the attachment end to the plane of normal wrench tight engagement. In order to obtain a pressure-tight seal with conventional pipe threads, either the internally threaded surface or externally threaded member must be tapered.

The internally threaded surface of the pipe fitting, in absence of the compression band, is manufactured with (i) a pitch diameter along the internally threaded surface which is larger than that which is normally specified to mate with the externally threaded member, and (ii) a pitch of thread which is specified to mate with the externally threaded member. Current recognized standards for pipe threads is outlined in Pipe Threads, General Purpose (INCH) ANSI/ASME B1.20.1-1983, sponsored and published by the American Society of Mechanical Engineering (hereinafter "ANSI/ASME Standards") which is incorporated herein by reference.

Pursuant to ANSI/ASME Standards, the pitch diameter at the attachment end is equal to $E_1$. Thus, in accordance with this invention, the internally threaded surface is manufactured in the pipe fitting, in absence of the compression band, to have an oversized pitch diameter of $E_P$ at the attachment end, where $E_P$ is larger than the pitch diameter $E_1$.

The amount that the pitch diameter is manufactured oversized varies according to the desired compressive preload on the strengthened pipe fitting. The compressive preload increases proportionate to the amount the pitch diameter is manufactured oversized. Increased compression preloads decrease the resulting expansion loads after joint make-up. However, excessive compressive preloads can cause failure in the pipe fitting prior to joint make-up.

Optimally, for plastic pipe fittings, the pitch diameter is initially manufactured in the pipe fitting to be approximately equal to the resulting pitch diameter after wrench-tight engagement with the externally threaded surface, so that expansion loads caused during wrench-tight engagement will be substantially negated. For plastic female pipe fittings, the amount that pitch diameter expands $E_E$ during wrench-tight engagement is approximately equal to the pitch of thread (P) multiplied by the taper of thread (T) multiplied by the number of 360 degree turns past hand tight engagement (W). Thus, for plastic pipe fittings, the pitch diameter $E_P$ as originally manufactured, is substantially equal to $E_1$ plus (P multiplied by about 0.125).

However, other compressive preloads also effect the resilience of the strengthened pipe fitting. Accordingly, for example, $E_P$ can be at least as large as $E_1$ plus (P multiplied by Z). Z is a number between about 0.05 inches to 0.19 inches and preferably from about 0.10 inches to 0.13 inches.

The following Table A provides a listing of (i) externally threaded surfaces made pursuant to ANSI/ASME Standards, (ii) the pitch diameter recommended at the attachment end ($E_1$) by ANSI/ASME Standards for an internally threaded surface to mate with the externally threaded surface and (iii) the pitch diameter at the attachment end originally produced in the internally threaded surface ($E_P$) pursuant to this invention.

TABLE A

| Nominal Pipe Size of Externally Threaded Surface (inches) | Pitch Diameter Recommended by ANSI/ASME Standards at Attachment End (E.sub.1) Internally Threaded Surface (inches) | Pitch Diameter Manufactured at Attachment End (E.sub.P) of Internally Threaded Surface (inches) |
| --- | --- | --- |
| 1/16 | 0.28118 | 0.285 |
| 1/8 | 0.37360 | 0.375 |
| 1/4 | 0.49163 | 0.498 |
| 3/8 | 0.62701 | 0.634 |
| 1/2 | 0.77843 | 0.787 |
| 3/4 | 0.98887 | 0.998 |
| 1 | 1.23863 | 1.249 |
| 1 1/4 | 1.58338 | 1.594 |
| 1 1/2 | 1.82234 | 1.833 |
| 2 | 2.29627 | 2.307 |
| 2 1/2 | 2.76216 | 2.778 |
| 3 | 3.38850 | 3.404 |
| 3 1/2 | 3.88881 | 3.904 |
| 4 | 4.38712 | 4.403 |
| 5 | 5.44929 | 5.465 |
| 6 | 6.50597 | 6.522 |
| 8 | 8.50003 | 8.516 |
| 10 | 10.62094 | 10.636 |
| 12 | 12.61781 | 12.633 |
| 14 O.D. | 13.87262 | 13.888 |
| 16 O.D. | 15.87575 | 15.891 |
| 18 O.D. | 17.87500 | 17.891 |
| 20 O.D. | 19.87031 | 19.886 |
| 24 O.D. | 23.86094 | 23.877 |

Since the pitch diameter is originally manufactured oversized, in absence of the compression band, the hand tight engagement of pipe fitting onto the externally threaded surface is longer than the length normally recommended and number of 360 degree turns for hand tight engagement is more than normally recommended. For example, if the normally recommended number of 360 degree turns for hand-tight engagement is equal to Y, the pitch diameter is manufactured oversized so that in the absence of the compression band, the number of 360 degree turns required to obtain hand-tight engagement is (Y plus R turns). R is a number between about 1/2 to about 2 turns and preferably from about 1 1/2 to about 2 turns onto the externally threaded member. R can be a number greater than 2 turns.

After the pipe fitting is manufactured, the compression band is fitted onto the attachment end of the pipe fitting. The compression band is tubular, hollow and fitted onto the attachment end of the pipe fitting, without the externally threaded member connected to the pipe fitting. Preferably, the compression band is pressed fitted onto the attachment end of the pipe fitting for ease of assembly. The compression band is sized to radially and uniformly compress and reduce the pitch diameter along substantially the entire effective thread length so that the pitch diameter of the strengthened pipe fitting is within the normally recommended standards (currently ANSI/ASME Standards) for mating to the externally threaded member.

The invention also includes a method for making a strengthened pipe fitting for connection to an externally threaded member, which better withstands the deformation produced during joint make-up, overtightening of the pipe joint and stress fatigue failure. The method comprises the steps of (i) manufacturing a pipe fitting having an internally threaded surface with a pitch diameter which is larger than that which is normally specified to mate with the externally threaded member and (ii) radially and uniformly compressing the internally threaded surface with a compression band, prior to connecting the internally threaded surface to the externally threaded member, so that the internally threaded surface has a pitch diameter that mates with the externally threaded member.

The present invention provides a strengthened pipe fitting and a method for making a strengthened pipe fitting which better withstands the deformation produced during joint make-up, overtightening during joint make-up, and stress fatigue failure. The strengthened pipe fitting allows for the use of plastic pipe fittings with female pipe threads in pressure tight applications without the need for pressure derating in the pipe system as the result of weak pipe joints.

DRAWINGS

These and other features, aspects and advantages of the present invention will become better understood with reference to the following description, appended claims and accompanying drawings where:

DETAILED DESCRIPTION

Figure 1:
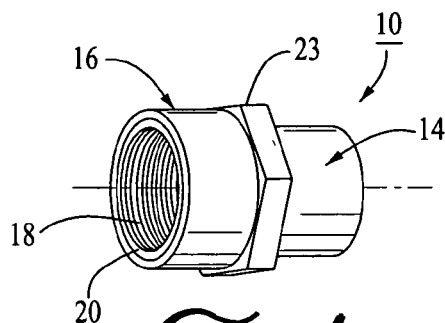
FIG. 1 is a perspective view of a strengthened pipe fitting embodying features of the present invention.
Figure 2:
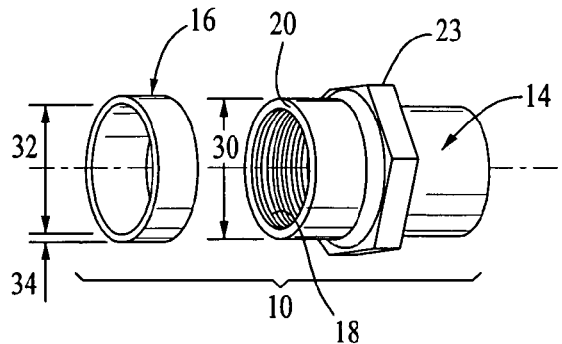
FIG. 2 is an exploded perspective view of the pipe fitting and compression band of FIG. 1.
Figure 3:
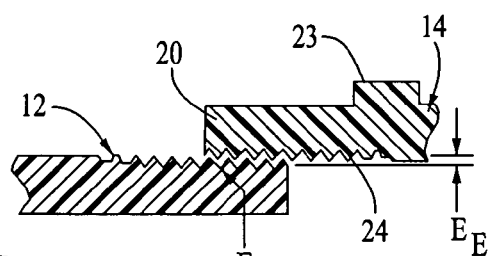
FIG. 3 is a side section view of the internally threaded surface without the compression band fitted onto the pipe fitting and the externally threaded surface.

With reference to the figures, the present invention is directed to a strengthened pipe fitting 10 for connecting to an externally threaded member 12 and a method for making a strengthened pipe fitting 10.

The strengthened pipe fitting 10 for connecting to an externally threaded member 12 comprises a pipe fitting 14 and (ii) a compression band 16. The pipe fitting 14 shown in the figures comprises a hollow conduit having an internally threaded surface 18 on an attachment end 20 for connecting to the externally threaded member 12 and a connector 22 opposite the attachment end 20 for connecting the strengthened pipe fitting 10 to another pipe fitting (not shown).

The term "pipe fitting" 14 as used herein generally means any fitting used in fluid, gas or solid transportation systems, including lengths of pipe, pipe nipples, connectors, adapters, T's, Y's, elbows, end caps, transition fittings and valves. The length or shape of the pipe fitting 14 varies according to the specific application. The pipe fitting 14 shown in the figures is a transition fitting useful for the transition from a metal pipe fitting having tapered external pipe threads to a plastic tube (not shown) which relies upon a slip, solvent cemented joint. Additionally, the pipe fitting 14 shown in the figures includes an optional, hexagonal-shaped wrench surface 23 which is used during joint make-up.

The pipe fitting 14 is made of any material which (i) is not adversely affected by the compressive loads subjected upon the attachment end 20 by the compression band 16, (ii) is not adversely affected by the fluid, gas or solid being transported in the pipe fitting 14, and (iii) is capable of withstanding the desired pressure rating. In most cases, the pipe fitting 14 is made from plastic since (i) plastic pipe fittings 14 are particularly resilient to corrosion from many fluids, gases or solids and thus are well suited for a wide variety of applications, and (ii) plastic pipe fitting 14 are particularly susceptible to structural failure during joint make-up and/or stress fatigue failure. For example, pipe fittings 14 made from Polyvinyl Chloride (PVC) ASTM D1784 Classification 12454-B or Chlorinated Polyvinyl Chloride (CPVC) ASTM D1784 Classification 23447-B make excellent strengthened pipe fittings 10.

The internally threaded surface 18 extends from the attachment end 20 of the pipe fitting to at least a plane of normal wrench tight engagement 24 of the internally threaded surface 18. The internally threaded surface 18 has a pitch diameter 26 along the internally threaded surface 18 and an effective thread length 28 which extends from the attachment end 20 to a position between the attachment end 20 and the plane of normal wrench tight engagement 24. Typically, the internally threaded surface 18 is either tapered internal pipe threads or straight internal pipe threads. In the case of tapered pipe threads, the pitch diameter 26 decreases along the internally threaded surface 18 from the attachment end 20 to the plane of normal wrench tight engagement 24. Alternatively, with straight internal pipe threads, the pitch diameter 26 remains constant along the internally threaded surface 18 from the attachment end 20 to the plane of normal wrench tight engagement 24. With conventional pipe threads, either the internally threaded surface 18 or externally threaded member 12 is tapered to obtain a pressure tight seal.

The internally threaded surface 18 is manufactured in the pipe fitting 14, in absence of the compression band 16, to have a pitch diameter 26 along the internally threaded surface 18 which is larger than that specified to mate with the externally threaded member 12. Since the compression band 16 reduces the pitch diameter 26 along the internally threaded surface 18 to the normally specified dimensions, the amount that the pitch diameter 26 is manufactured oversized varies according to the desired compressive preload upon the internally threaded surface 18. Since the resulting expansion loads after wrench tight engagement depend upon the initial compressive preload, any amount of compressive preload will reduce resulting expansion loads. However, excessive compressive preloads can cause failure during assembly of the pipe fitting 14 and the compression band 16.

Optimally, for plastic pipe fittings 14, the pitch diameter 26 of the internally threaded surface 18 as originally produced, is designed to equal the pitch diameter 26 of the internally threaded surface 18 after wrench tight engagement with the externally threaded surface 12, Thus, the stress associated with the expansion of the internally threaded surface 18 during wrench tight engagement is essentially negated since the internally threaded surface 18 is originally produced to that size.

During joint make-up, the expansion in the internally threaded surface 18 occurs after hand tight engagement and during wrench tight engagement. The number of 360 degree turns for hand tight engagement and wrench tight engagement are specified by industry standards. If the internally threaded surface 18 is manufactured oversized, the number of 360 degree turns of the pipe fitting 14, in absence of the compression band, required to obtain hand tight engagement with the externally threaded surface is more than the normal industry standards. The current industry standard for wrench tight engagement in plastic pipe threads is two 360 degree turns past hand tight engagement. Thus, if it is desired to have the pitch diameter 26 as originally manufactured equal the pitch diameter 26 after wrench tight engagement, the internally threaded surface 18 is manufactured to have a pitch diameter 26 sufficiently oversized so that the number of 360 degree turns needed to obtain hand tight engagement, in absence of the compression band 16, is two additional 360 degree turns beyond industry standards. Alternatively, for reduced compressive preloads, the internally threaded surface can be manufactured to have a pitch diameter sufficiently oversized so that the number of 360 degree turns of the pipe fitting needed to obtain hand tight engagement is about ½ to about two turns beyond industry standards.

The expansion which occurs in the pitch diameter 26 at the attachment end during normal wrench tight engagement with a plastic pipe fitting 14 can be approximated by the following formula:

$$E_E = P \times T \times W \quad (1)$$

Thus, if it is desired to have the pitch diameter 26 as originally produced equal the pitch diameter 26 after wrench tight engagement, the pitch diameter 26 at the attachment end is originally produced in the internally threaded surface 18 according to the following formula:

$$E_P = E_1 + E_E \text{ or} \quad (2)$$

$$E_P = E_1 + (P \times T \times W) \text{ or} \quad (3)$$

$$E_P = E_1 + (P \times (T \times W)) \quad (4)$$

For plastic pipe fittings 14, the standard thread taper, T is equal to 0.0625 and the number of 360 degree turns past hand tight engagement, W is equal to 2. Accordingly, for plastic pipe fittings 14, $$(T \times W) = 0.125 \text{ and} \quad (5)$$

$$E_P = E_1 + (P \times 0.125) \quad (6)$$

Alternatively, for other compressive preloads, the pitch diameter 26 can be originally manufactured less oversized or more oversized, i.e., $$E_P = E_1 + (P \times Z) \quad (7)$$

where Z is a number between about 0.05 and 0.19.

The connector 22 is capable of connecting the strengthened pipe fitting 10 in fluid communication to another pipe fitting (not shown). In the embodiment shown in the figures, the connector 22 is a right cylindrical shaped opening for receiving a tubular pipe (not shown) to form a slip solvent cemented joint. Alternatively, the connector 22 can be an internally or externally threaded surface (not shown). In the embodiment shown in the figures, the connector 22 is opposite the attachment end 20. However, depending upon the type of pipe fitting 14, the connector 22 can be positioned in other locations (i.e., the pipe fitting 14 can be an elbow or T).

The compression band 16 is tubular, hollow and fitted onto an outside diameter 30 of the attachment end 20 of the pipe fitting 14, without the externally threaded member 12 connected to the pipe fitting 14. Preferably, the compression band 16 is press fitted onto the outside diameter 30, for ease of assembly. The compression band 16 is typically made from a metal such as Type 316 Stainless steel which is resistant to corrosion. Alternatively, the compression band 16 can be made from other materials which are sufficiently rigid to compress the attachment end 20 of the pipe fitting 14.

Typically, the compression band 16 is produced with an inside diameter 32 which is smaller than the outside diameter 30 of the pipe fitting 14 at the attachment end 20 to effect an interference fit when the pipe fitting 14 and the compression band 16 are assembled. The compression band 16 is sized so that the interference fit compresses the internally threaded surface 18 and reduces its pitch diameter 26 to within the normally recommended standards. The maximum inside diameter 32 required to produce the necessary interference fit varies according to (i) the materials utilized in the strengthened pipe fitting 10, (ii) how much oversized the pitch diameter 26 is originally produced in the pipe fitting 14, and (iii) the outside diameter 30 produced in the pipe fitting 14. For example, for a plastic pipe fitting 14 and a stainless steel compression band 16, if the pitch diameter originally produced $E_P$ at the attachment end 20 is approximately equal to $E_1+E_E$ then the inside diameter 32 can be determined by the following formula:

$$ID = OD - E_E \quad (8)$$

Further, the resulting pitch diameter 26 of the strengthened pipe fitting 10, at the attachment end 20 can be approximated with the following equation:

$$E_1 = E_P - (OD - ID) \quad (9)$$

The compression band 16 must have a sufficient thickness 34 to compress the pipe fitting 14. The required thickness 34 varies according to the materials utilized in the strengthened pipe fitting 10. For example, a thickness 34 of 0.015 inches is sufficient for a stainless steel compression band 16 with a plastic pipe fitting 14.

Further, the compression band 16 must be sufficiently long to reduce the pitch diameter 26 of the internally threaded surface 18 along substantially the entire effective thread length 28. Typically, a minimum length of the compression band 16 is approximately equal to the effective thread length which is calculated as follows:

$$L_2 = L_1 + L_3 \quad (10)$$

Figure 4:
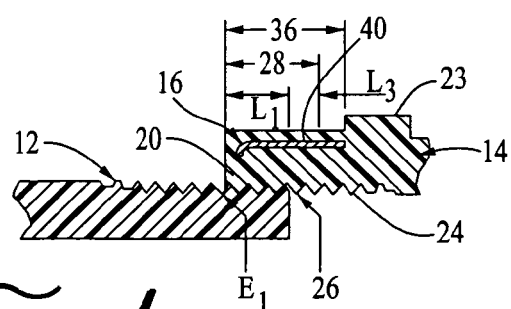
FIG. 4 is a side section view of the internally threaded surface, the compression band, and the externally threaded surface.
Figure 5:
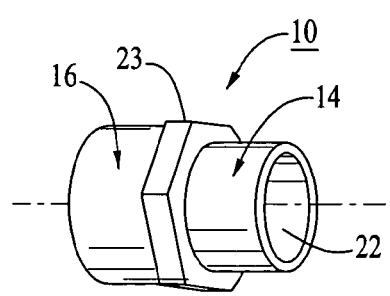
FIG. 5 is a perspective view of the strengthened pipe fitting of FIG. 1 showing the connector.

In the invention, the compression band 16 is covered by a non-corrosive material 40 to protect the compression band 16 from corrosive elements in the environment. The non-corrosive material 40 is typically a plastic material, such as polyvinyl chloride (PVC) or chlorinated polyvinyl chloride (CPVC). When the non-corrosive material 40 is a plastic material, it can be bonded directly to the compression band 16 by standard bonding methods familiar to those in the art. Where the attachment end 20 of the pipe fitting 14 is made from a plastic or other corrosive material, the compression band 16 can be wholly encapsulated within the attachment end 20 as illustrated in FIG. 4.

The following examples are provided for suitable strengthened pipe fittings 10 made in accordance with the present invention. For these examples, (i) the pitch diameter 26 as originally manufactured in the pipe fitting 14 is approximately equal to the pitch diameter 26 after wrench tight engagement, (ii) the internally threaded surface 18 is tapered internal pipe threads, (iii) the pipe fitting 14 is injection molded Polyvinyl Chloride (PVC), ASTM D1784 Classification 12454-B or Chlorinated Polyvinyl Chloride (CPVC) ASTM D1784 Classification 23447-B and (iv) the compression band 16 is made from Type 316 Stainless steel, 0.015 thick, full annealed.

EXAMPLE 1

The following example illustrates the design calculations for a strengthened pipe fitting 10 having an internally threaded surface 18 which mates to a ½" nominal externally threaded member 12.[1] The Outside diameter 30 (OD) is determined by manufacturer to be about 1.185".

[1] Specifications and dimensions are rounded to nearest 0.001 inch. Dimensions obtained from Table 2, page 6 of ANSI/ASME Standards.

| |
|---|
| Pitch Diameter 26 at attachment end 20 ($E_1$) = 0.778" |
| Taper of thread (T) = 0.063 |
| Pitch of thread (P) = 0.071 |
| Thread length for hand tight engagement ($L_1$) = 0.320" |
| Thread length for wrench tight engagement ($L_3$) = 0.248" |

Determination of expansion of pitch diameter 26 during wrench tight engagement:

$$E_E = T \times P \times W = 0.063 \times 0.071 \times 2 = 0.009"$$

Therefore, the pitch diameter 26 as originally produced in the pipe fitting 14 at the attachment end 20 can be calculated as follows:

$$E_P = E_1 + E_E = 0.778" + 0.009" = 0.787"$$

Further, the inside diameter 32 of the compression band 16 can be calculated as follows:

$$ID = OD - E_E = 1.185" - 0.009" = 1.176"$$

Additionally, the minimum length 36 of the compression band 16 can be calculated as follows:

$$L_2 = L_1 + L_3 = 0.320" + 0.248" = 0.567"$$

Press fitting the compression band 16 onto the pipe fitting 14 yields a strengthened pipe fitting 10 with the required pitch diameter 26 at the attachment end 20, as illustrated in the following equation:

$$E_1 = E_P - (OD - ID) = 0.787"(1.185" - 1.176")$$
$$= 0.778"$$

EXAMPLE 2

The following example illustrates the design calculations for a strengthened pipe fitting 10 having an internally threaded surface 18 which mates to a 2" nominal externally threaded member 12.[2] The Outside diameter 30 (OD) is determined by manufacturer to be about 2.990".

[2] Specifications and dimensions are rounded to nearest 0.001 inch. Dimensions obtained from Table 2, page 6 of ANSI/ASME Standards.

| |
|---|
| Pitch Diameter 26 at attachment end 20 ($E_1$) = 2.296" |
| Taper of thread (T) = 0.063 |
| Pitch of thread (P) = 0.087 |
| Thread length for hand tight ($L_1$) = 0.436" |
| Thread length for wrench tight engagement ($L_3$) = 0.261" |

Determination of expansion of pitch diameter 26 during wrench tight engagement:

$$E_E = T \times P \times W = 0.063" \times 0.087 \times 2 = 0.011"$$

Therefore, the pitch diameter 26 as originally in the pipe fitting 14 at the attachment end 20 can be calculated as follows:

$$E_P = E_1 + E_E = 2.296" + 0.11" = 2.307"$$

Further, the inside diameter 32 of the compression band 16 can be calculated as follows:

$$ID = OD - E_E = 2.990" - 0.11" = 2.979"$$

Additionally, the minimum length 36 of the compression band 16 can be calculated to be as follows:

$$L_2 = L_1 + L_3 = 0.436 + 0.261 = 0.697$$

Assembly of the compression band with the pipe fitting 14 yields a strengthened pipe fitting 10 with the required pitch diameter 26 at the attachment end 20, as illustrated in the following equation:

$$E_1 = E_P - (OD - ID) = 2.307'' - (2.990'' - 2.979'') = 2.296''$$

The strengthened pipe fitting 10 and method for making a strengthened pipe fitting 10 has many advantages which include the ability to utilize plastic pipe fittings 14 which withstand deformation caused during joint make-up, over-tightening of the pipe joint and stress fatigue failure over time. Accordingly, plastic pipe fittings 14 can be installed with no need for pressure derating of the system and can be used in the same places where metal pipe fittings are currently used.

Although the present invention has been described in considerable detail with reference to certain preferred versions, other versions are possible. For example, the compression band 16 could be made from galvanized steel. Therefore, the spirit and scope of the appended claims should not be limited to the description the preferred versions contained herein.

What is claimed is:

1. A strengthened pipe fitting for connecting to an externally threaded member, the strengthened pipe fitting comprising:
   (a) a pipe fitting having an internally threaded surface extending from an attachment end of the fitting to at least a plane of normal wrench tight engagement, the internally threaded surface having (i) a pitch diameter along the internally threaded surface and (ii) an effective thread length which extends from the attachment end to the plane of normal wrench tight engagement; and
   (b) a tubular, hollow, metal compression band, fitted onto the attachment end of the pipe fitting, without the externally threaded member connected to the pipe fitting, the compression band radially compressing the attachment end of the pipe fitting and radially and uniformly reducing the pitch diameter along substantially the entire effective thread length from the pitch diameter as originally produced in the pipe fitting;
   wherein the compression band is made from stainless steel and has an external surface which is covered by a non-corrosive material.

2. The strengthened pipe fitting of claim 1 wherein the external surface of the compression band is covered by a plastic material.

3. The strengthened pipe fitting of claim 1 wherein the pipe fitting is made from plastic.

4. The strengthened pipe fitting of claim 1 wherein the compression band is press fitted onto the pipe fitting.

5. The strengthened pipe fitting of claim 1 wherein the internally threaded surface includes tapered internal pipe threads.

6. The strengthened pipe fitting of claim 1 wherein the internally threaded surface includes straight internal pipe threads.

7. The strengthened pipe fitting of claim 1 wherein (i) the internally threaded surface has a pitch of thread which is equal to P; (ii) the internally threaded surface of the strengthened pipe fitting has a pitch diameter at the attachment end which is equal to $E_1$; (iii) in absence of the compression band, the pitch diameter of the pipe fitting at the attachment end is equal to $E_P$; (iv) $E_P$ is at least as large as $E_1$ plus (P multiplied by Z); and (v) Z is a number between about 0.05 to 0.19.

8. The strengthened pipe fitting of claim 1 wherein (i) the internally threaded surface has a pitch of thread which is equal to P; (ii) the internally threaded surface of the strengthened pipe fitting has a pitch diameter at the attachment end which is equal to $E_1$; (iii) in absence of the compression band, the pitch diameter of the pipe fitting at the attachment end is equal to $E_P$; and (iv) $E_P$ is at least as large as $E_1$ plus (P multiplied by 0.12).

9. The strengthened pipe fitting of claim 1 wherein, (i) the number of 360 degree turns of the strengthened pipe fitting required to obtain hand tight engagement with the externally threaded member is approximately equal to Y; (ii) in the absence of the compression band, the number of 360 degree turns of the pipe fitting required to obtain hand tight engagement with the externally threaded member is approximately equal to Y plus R; and (iii) R is a number from about ½ to 2.

10. The strengthened pipe fitting of claim 1 wherein, (i) the number of 360 degree turns of the strengthened pipe fitting required to obtain hand tight engagement with the externally threaded member is approximately equal to Y; (ii) in the absence of the compression band, the number of 360 degree turns of the pipe fitting required to obtain hand tight engagement with the externally threaded member is equal to Y plus R; and (ii) R is a number between 1 to 2.

11. The strengthened pipe fitting of claim 1 wherein, (i) the number of 360 degree turns of the strengthened pipe fitting required to obtain hand tight engagement with the externally threaded member is approximately equal to Y; and (ii) in the absence of the compression band, the number of 360 degree turns of the pipe fitting required to obtain hand tight engagement with the externally threaded member is at least equal to Y plus 2.

12. A strengthened pipe fitting for connecting to an externally threaded member, the strengthened pipe fitting comprising:
   (a) a pipe fitting having an internally threaded surface extending from an attachment end of the fitting to at least a plane of normal wrench tight engagement, the internally threaded surface having (i) a pitch diameter along the internally threaded surface and (ii) an effective thread length which extends from the attachment end to the plane of normal wrench tight engagement; and
   (b) a tubular, hollow, metal compression band, fitted onto the attachment end of the pipe fitting, without the externally threaded member connected to the pipe fitting, the compression band radially compressing the attachment end of the pipe fitting and radially and uniformly reducing the pitch diameter along substantially the entire effective thread length from the pitch diameter as originally produced in the pipe fitting;
   wherein the compression band is encapsulated within the pipe fitting.

13. The strengthened pipe fitting of claim 12 wherein the pipe fitting is made from plastic.

14. The strengthened pipe fitting of claim 12 wherein the compression band is made from stainless steel.

15. The strengthened pipe fitting of claim 12 wherein the internally threaded surface includes tapered internal pipe threads.

16. The strengthened pipe fitting of claim 12 wherein the internally threaded surface includes straight internal pipe threads.

17. The strengthened pipe fitting of claim 12 wherein, (i) the number of 360 degree turns of the strengthened pipe fitting required to obtain hand tight engagement with the externally threaded member is approximately equal to Y; (ii) in the absence of the compression band, the number of 360 degree turns of the pipe fitting required to obtain hand tight engagement with the externally threaded member is approximately equal to Y plus R; and (iii) R is a number from about ½ to 2.

18. The strengthened pipe fitting of claim 17 wherein R is a number from 1 to 2.

19. The strengthened pipe fitting of claim 12 wherein, (i) the number of 360 degree turns of the strengthened pipe fitting required to obtain hand tight engagement with the externally threaded member is approximately equal to Y; and (ii) in the absence of the compression band, the number of 360 degree turns of the pipe fitting required to obtain hand tight engagement with the externally threaded member is at least equal to Y plus 2.

20. The strengthened pipe fitting of claim 12 wherein the internally threaded surface extends from the attachment end to vanish threads, has an effective thread length extending from the attachment end to a position before the vanish threads, and has a pitch diameter along the internally threaded surface.

* * * * *